United States Patent [19]

Croteau

[11] Patent Number: 4,616,317
[45] Date of Patent: Oct. 7, 1986

[54] DATA LINK FOR A RADIOACTIVITY DISTRIBUTION DETECTION SYSTEM

[75] Inventor: Francis R. Croteau, Burlington, Mass.

[73] Assignee: Baird Corporation, Bedford, Mass.

[21] Appl. No.: 532,002

[22] Filed: Sep. 14, 1983

[51] Int. Cl.[4] .................. G06F 15/42; G02B 5/14
[52] U.S. Cl. ................................ 364/414; 364/900;
358/901; 350/96.16; 378/901
[58] Field of Search ............ 364/400, 413–414,
364/900 MS File; 358/111, 901; 378/4, 21, 162,
165, 901; 250/215–216, 366; 350/96.1, 96.11,
96.12, 96.13, 96.14, 96.16

[56] References Cited

U.S. PATENT DOCUMENTS

| | | | |
|---|---|---|---|
| 4,044,332 | 8/1977 | Grenier | 364/900 |
| 4,249,266 | 2/1981 | Nakamori | 350/96.16 X |
| 4,267,452 | 5/1981 | Govaert | 250/366 |
| 4,276,656 | 6/1981 | Petryk, Jr. | 350/96.16 X |
| 4,366,565 | 12/1982 | Herskowitz | 350/96.16 X |
| 4,436,365 | 3/1984 | Hodgins et al. | 350/96.16 |
| 4,450,478 | 5/1984 | Ledley | 358/111 |
| 4,480,311 | 10/1984 | Mastain et al. | 364/414 X |

Primary Examiner—Gary V. Harkcom
Attorney, Agent, or Firm—Morse, Altman & Dacey

[57] ABSTRACT

In a radioactivity distribution detection system of the kind for determining the location and distribution of radioactive events emitted from a subject under diagnosis, the improvement of electrically isolating the subject from the potentially harmful effects of leakage currents. The improvement comprises a first converter for converting electronic data signals representing the location and distribution of radioactive events to optical signals, a coupler for effecting an optical path of transmission for the converted optical signals, and a second converter for converting the transmitted optical signals to electronic data signals so that they can be processed to provide a presentation of the distribution of the sensed events. Preferably, the coupler comprises a pair of fiber optic cables for complete, duplex and bidirectional transmission of optical signals. The coupler allows the processing console to be far removed from the sensors and detectors of the radioactive events. The coupler also allows a reduction in the bulk and weight of such systems while enhancing their transmission capability. The coupler effectively protects a subject under diagnosis from the potentially harmful effects of leakage currents emanating from the processing console.

2 Claims, 2 Drawing Figures

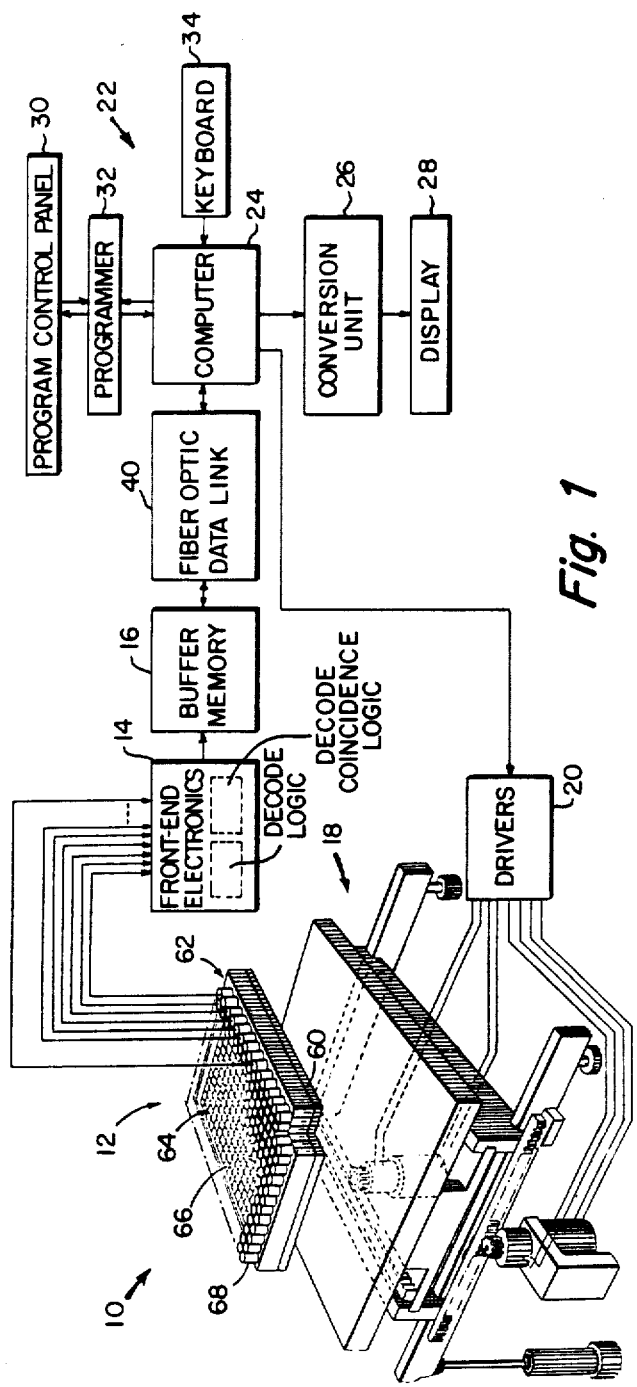
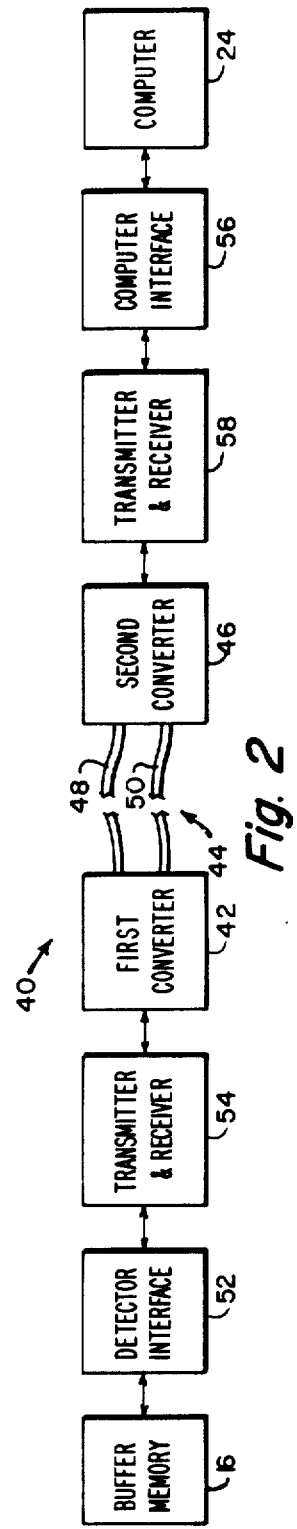
Fig. 1
Fig. 2

DATA LINK FOR A RADIOACTIVITY DISTRIBUTION DETECTION SYSTEM

BACKGROUND OF THE INVENTION

1. Field of the Invention

The present invention relates generally to detecting systems and, more particularly, to an improved radioactivity distribution detection system provided with a data link that effectively shields a subject under diagnosis from the potentially harmful effects of electrical leakage currents.

2. The Prior Art

Radioactivity distribution detection systems of the kind for determining the location and distribution of radioactive material injected in diagnostic amounts into a human body have been in clinical use for sometime. These systems employ an array of scintillators for sensing radioactive events within the body, most notably in the heart, and a plurality of detectors for detecting the sensed events. Electronic data signals generated by the plurality of detectors first ar processed in front-end electronics and accumulated and stored in a buffer memory. Following the accumulation period, the accumulated data in raw digital form are transmitted over electrical cables linking the buffer memory to a computer of a processing console. In the console, these data are processed to provide a pictorial representation of the distribution and of the relative radioactive event levels detected by the scintillators.

The electrical cables linking the buffer memory to the computer however, also establish an open electrical connection between the processing console and the scintillators and detectors, exposing thus the subject under diagnosis to the potentially harmful effects of leakage currents emanating from the console. The electrical cables also impose a practical limit on the distance by which the processing console can be physically separated from the scintillators and detectors, without utilizing special drives down the cable. The electrical cables further add to the weight and bulk of these systems.

SUMMARY OF THE INVENTION

It is a principal object of the present invention to overcome the above disadvantages by providing an improved radioactivity distribution detection system provided with a data link that effectively shields a subject under diagnosis from electrical leakage currents emanating from the console, that allows for the console to be far removed from the sensors and detectors, and that reduces the bulk and weight of the system while enhancing its transmission capability.

More specifically, it is an object of the present invention to provide an improved radioactivity distribution detection system provided with a data link, in which system the improvement comprises a first converter for converting electronic data signals representing the location and distribution of radioactive events to optical signals, an optical coupler for effecting an optical path of transmission for the converted optical signals, and a second converter for converting the transmitted optical signals to electronic data signals acceptable to a computer of a processing console, to be processed thereby to provide a pictorial representation of the distribution and of the relative radioactive event levels detected by the scintillators. Preferably, the optical coupler comprises a pair of fiber optic cables for complete, duplex and bidirectional transmission of optical signals carrying accumulated and stored data. The optical coupler effectively isolates and shields, thus protects, a subject under diagnosis from the potentially harmful effects of leakage currents emanating from the processing console. Thus, the leakage current restrictions in the processing console no longer have to be identical with those prevailing in the sensors and detectors. In fact, the leakage current specifications for the processing console now can be somewhat liberalized, reducing its cost of production. The optical coupler also allows for the processing console to be far removed from the sensors and detectors without the additional cost of providing for special drivers. The optical coupler further contributes to a reduction in the overall bulk and weight of such systems, making them less costly to produce, package, ship and set up than possible with present day systems.

Other objects of the present invention will in part be obvious and will in part appear hereinafter.

The invention accordingly comprises the radioactivity distribution detection system of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 1 is a block and schematic diagram of an improved radioactivity distribution detection system embodying the present invention; and FIG. 2 is a block diagram of a part of the system shown in FIG. 1.

DETAILED DESCRIPTION OF THE PREFERRED EMBODIMENT

Generally, the illustrated embodiment of a radioactivity distribution detection system 10 comprises a detector assembly 12, a front-end electronics 14, a buffer memory 16, and a programmable XY platform 18 supporting a subject under diagnosis and movable by a driver control 20. These enumerated parts 12, 14, 16, 18 and 20 of the system 10 define what generally is referred to in the radioactivity detection art as the "gamma camera" portion of the system 10. The other portion of the system 10 is defined by a data processing console 22, including a computer 24, a halftone conversion unit 26, a display 28, a program control panel 30, a programmer 32 and a manual data input 34, such as a keyboard.

These two portions of the radioactivity distribution detection system 10, i.e., the gamma camera and the date processing console 22, are as more fully described in U.S. Pat. Nos. 4,044,332 and 4,267,452, both assigned to the assignee herein, which patents and their disclosures are incorporated herein by reference. The two portions of the radioactivity distribution detection system 10, as described in the above two U.S. Pat. Nos. 4,044,332 and 4,267,452, were linked by electrical cables transmitting the electronic signals, accumulated and stored in the buffer memory 16, to the computer 24 of the data processing console 22. In lieu of this electrical cable connection, with its disadvantages as enumerated above, the present invention provides an optical coupling between the two portions in the form of a fiber optic data link 40. The fiber optic data link 40 effectively isolates the two portions (i.e., the gamma camera and the processing console) electrically from each other.

The fiber optic data link 40 is shown connected between the buffer memory 16 of the gamma camera portion and the computer 24 of the data processing console 22. The fiber optic data link 40 essentially comprises first converter 42 for converting the electronic data signals accumulated and stored in the buffer memory 16 to optical signals, an optical coupler 44 for providing an optical path of transmission for the converted optical signals between the buffer memory 16 and the computer 24, and a second converter 46 for reconverting the transmitted optical signals to electronic data signals acceptable to the computer 24. The optical coupler 44 comprises a pair of fiber optic cables 48 and 50 for complete, duplex, bidirectional transmission of optical signals carrying the accumulated and stored data. While any suitable known converters may be employed for the first and second converters 42 and 46, an Augat type 698-126 EGE module preferably is used as the first converter 42, and an Augat type 698-127 DG1 module preferably is used as the second converter 46.

The fiber optic data link 40 further includes a detector interface 52 and a transmitter and a receiver 54 bidirectionally coupled between the buffer memory 16 and the first converter 42, and a computer interface 56 and a transmitter and a receiver 58 bidirectionally coupled between the computer 24 and the second converter 46. Preferably, the detector interface 52 includes a Control Read Only Memory (CROM) designed to operate in alternating address and logic cycles, a micro program sequencer and a pipeline register. The computer interface 56 essentially is similarly constituted.

The optical signals carrying the accumulated and stored data over the pair of fiber optic cables 48 and 50 are electromagnetic waves of radiation in the region of the optical spectrum near visible light and, as such, traveling near the speed of light. Transmission thus, is not only fast even over greatly increased distances, certainly for distances far beyond those practicable or contemplated for the radioactivity distribution detection system 10, but it is achievable without the need of any special drivers since the energy loss is for practical purposes negligible or almost nonexistent.

Consequently, the optical coupler 44 of the invention allows the data processing console 22 to be as far removed from the detector assembly 12 as desired. The pair of fiber optic cables 48 and 50, being formed of long, thin flexible fibers of glass, plastic or other transparent materials, also are of light weight despite the great length of the cables 48 and 50. As such, they also serve materially to reduce the bulk and weight of the overall system 10 while at the same time enhancing its transmission capability. Most importantly however, the optical coupler 44 of the invention represents a most desirable safety feature in that it effectively isolates and shields, and thus protects, a subject under diagnosis from the potentially harmful effects of leakage currents emanating from the data processing console 22. Such leakage currents, it should be noted, can be as high as fifty micro-amperes.

A subject under diagnosis, as more fully described in the referenced U.S. Pat. Nos. 4,044,332 and 4,267,452, is positioned on the movable programmable XY platform 18, with a section of the subject, usually the heart, under diagnosis being in registration with a collimator 60. The subject is then injected with a diagnostic amount of radioactive material causing radioactive events to occur within that section of the body (i.e., the heart). The radioactive events are sensed by an array 62 of crystal assemblies 64 comprising a plurality of scintillators 66. Activated scintillators 66 in turn emit light signals, which are detected by a plurality of detectors 68 superimposed on the scintillators 66. Data signals generated by the detectors 68 first are processed in the front-end electronics 14 and then accumulated and stored in the buffer memory 16. A leakage current emanating from the data processing console 22 thus can cause potentially great harm to a subject under diagnosis who, more often than not, already is a patient in critical care. Because of the optical coupling between the two operative halves of the radioactivity distribution detection system 10 effecting electrical isolation therebetween, the likely cause for this prior potential harm now has been eliminated. Additionally, the electrical specifications for the data processing console 22 now also may be less stringent due to this electrical isolation of the console 22 from the detector assembly 12.

Thus it has been shown an described an improved radioactivity distribution detection system 10 provided with an optical coupling 40 linking its two operative half portions, which improved system 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. In a radioactivity distribution detection system including a plurality of sensors and detectors of radioactive events for generating electronic data signals defining address locations thereof, a front-end electronics for processing said electronic data signals and a buffer memory for accumulating and storing said electronic data signals prior to their transmission to a computer of a data processing console, the improvement of electrically isolating a subject under diagnosis comprising:
    (a) a first converter for converting said electronic data signals accumulated and stored in said buffer memory to optical signals;
    (b) a coupler for providing an optical path of transmission between said buffer memory and said computer for said optical signals;
    (c) a second converter for converting said transmitted optical signals to electronic data signals acceptable to said computer;
    (d) said coupler comprising a pair of fiber optic cables for complete, duplex, bidirectional transmission of optical signals carrying said accumulated and stored data;
    (e) said coupler allowing said data processing console to be removed from said plurality of sensors and detectors of radioactive events;
    (f) said coupler serving to protect a subject under diagnosis from the potentially harmful effects of leakage currents emanating from said console.

2. In the radioactivity distribution detection system of claim 1 further including a detector interface between said buffer memory and said first converter, and a computer interface between said computer and said second converter, said detector interface and said computer interface being similarly constituted, with each including a control read only memory (CROM) designed to operate in alternating address and logic cycles, a micro program sequencer and a pipeline register, said radioactivity distribution detection system further including a first transmitter and a first receiver between said detector interface and said first converter, and a second transmitter and a second receiver between said second converter and said computer interface.

* * * * *